(12) United States Patent
Jha et al.

(10) Patent No.: US 10,743,237 B2
(45) Date of Patent: Aug. 11, 2020

(54) TRANSMITTING SYSTEM INFORMATION CHANGE NOTIFICATIONS TO MTC DEVICES

(71) Applicant: Apple Inc., Cupertino, CA (US)

(72) Inventors: Satish Jha, Portland, OR (US); Mohammad Mamunur Rashid, Hillsboro, OR (US); Rath Vannithamby, Portland, OR (US); Tao Wu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 7 days.

(21) Appl. No.: 15/567,473

(22) PCT Filed: Dec. 1, 2015

(86) PCT No.: PCT/US2015/063217
§ 371 (c)(1),
(2) Date: Oct. 18, 2017

(87) PCT Pub. No.: WO2016/186696
PCT Pub. Date: Nov. 24, 2016

(65) Prior Publication Data
US 2018/0124685 A1 May 3, 2018

Related U.S. Application Data

(60) Provisional application No. 62/164,746, filed on May 21, 2015.

(51) Int. Cl.
*H04W 48/10* (2009.01)
*H04W 48/12* (2009.01)
(Continued)

(52) U.S. Cl.
CPC ............ *H04W 48/10* (2013.01); *H04W 4/70* (2018.02); *H04W 48/12* (2013.01); *H04W 68/02* (2013.01);
(Continued)

(58) Field of Classification Search
None
See application file for complete search history.

(56) References Cited

U.S. PATENT DOCUMENTS

2014/0293901 A1* 10/2014 Hegde ............... H04W 48/16
370/329
2015/0092674 A1 4/2015 Das et al.
(Continued)

FOREIGN PATENT DOCUMENTS

| WO | WO 2007/073079 A1 | 6/2007 |
| WO | WO 2008/062971 A1 | 5/2008 |
| WO | WO 2013/183966 A1 | 12/2013 |

OTHER PUBLICATIONS

3GPP TS 36.331; "$3^{rd}$ Generation Partnership Project; Technical Specification Group Radio Access Network; Evolved Universal Terrestrial Radio Access (E-UTRA); Radio Resource Control (RRC); Protocol specification"; (Mar. 2015); 445 pages; V12.5.0, (Release 12).

(Continued)

*Primary Examiner* — Gregory B Sefcheck
*Assistant Examiner* — Srinivasa R Reddivalam
(74) *Attorney, Agent, or Firm* — Stoel Rives LLP

(57) ABSTRACT

Technology for a user equipment (UE) operable to receive system information change notifications from an eNodeB is disclosed. The UE can receive one or more system information (SI) change notifications that indicate a change has occurred in one or more system information blocks (SIBs). The UE can receive a SIB1 that is associated with a value (Continued)

tag, and the SIB1 can include a bit-map that indicates which of the one or more SIBs include a change. The UE can compare the value tag associated with the SIB1 with a value tag stored at the UE. The UE can obtain scheduling information for the one or more SIBs that include a change according to the bitmap when the value tag associated with the SIB1 does not equal to the value tag stored at the UE. The UE can retrieve the SIBs that include a change using the scheduling information.

21 Claims, 9 Drawing Sheets

(51) Int. Cl.
    *H04W 4/70*     (2018.01)
    *H04W 68/02*     (2009.01)
    *H04W 48/16*     (2009.01)
    *H04W 72/12*     (2009.01)

(52) U.S. Cl.
    CPC ........ *H04W 48/16* (2013.01); *H04W 72/1215* (2013.01)

(56) References Cited

U.S. PATENT DOCUMENTS

| | | | |
|---|---|---|---|
| 2015/0382284 A1* | 12/2015 | Brismar | H04W 74/04 370/329 |
| 2016/0295499 A1* | 10/2016 | Tavildar | H04W 48/12 |
| 2017/0105166 A1* | 4/2017 | Lee | H04W 48/12 |
| 2017/0171797 A1* | 6/2017 | Nigam | H04W 68/005 |

OTHER PUBLICATIONS

ETSI MCC; "Report of 3GPP TSG RAN WG2 meeting #89 Athens, Greece, Feb. 9-13, 2015" 3GPP TSG R2-151051; (Feb. 14, 2015); 117 pages; RAN Working Group 2 meeting #89bis, Bratislava, Slovakia; V3.0.0; Agenda Item: 2.2.

Intel Corporation; "System information for Release—13 low complexity UEs and enhanced coverage"; 3GPP TSG R2-151106; (Apr. 20-24, 2015); 8 pages; RAN WG2 Meeting #89bis, Bratislava, Slovakia; Agenda: 7.4.2.

International search report dated May 2, 2016 in International Application No. PCT/US2015/063217, filed Dec. 1, 2015; 4 pages.

* cited by examiner

```
-- ASN1START

M-SystemInformationBlockType1 ::=        SEQUENCE {
    m-CellAccessRelatedInfo              SEQUENCE {
        m-PLMN-IdentityList              M-PLMN-IdentityList,
        m-TrackingAreaCode               M-TrackingAreaCode,
        m-CellIdentity                   M-CellIdentity,
        m-CellBarred                     ENUMERATED {barred, notBarred},
        m-intraFreqReselection           ENUMERATED {allowed, notAllowed},
    },
    cellSelectionInfo                    SEQUENCE {
        mQ-RxLevMin                      M-Q-RxLevMin,
        mQ-RxLevMinOffset                INTEGER (1..8)         OPTIONAL  -- Need OP
    },
    m-P-Max                              M-P-Max                OPTIONAL,       --
Need OP
    m-FreqBandIndicator                  M-FreqBandIndicator,
    m-SchedulingInfoList                   M-MSchedulingInfoList,

....

m-SI-WindowLength                      ENUMERATED {
                                         ms1, ms5, ms10, ms20, ms40, ms80,
                                         ms160, ms320, ...,}, m-SystemInfoValueTag                   INTEGER (0..31),
     m-SIBsChangedInfoBitMap                    M-SIBsChangedInfoBitMap, OPTIONAL,
          -- Need OP nonCriticalExtension                 NonCriticalExtension -IEs   OPTIONAL
}

....
M-SchedulingInfoList ::= SEQUENCE (SIZE (1..maxM-SI-Message)) OF M-SchedulingInfo M-SchedulingInfo ::=   SEQUENCE {
    m-SI-Periodicity                     ENUMERATED {
                                         rf8, rf32, rf64, rf128, rf256, rf512, rf1024,
rf2048, ...,},
    m-SIB-MappingInfo                    M-SIB-MappingInfo
}

M-SIB-MappingInfo ::= SEQUENCE (SIZE (0..maxM-SIB - 1)) OF M-SIB-Type

M-SIB-Type  ::=                          ENUMERATED {
                                         m-sibType3, m-sibType4, m-sibType5, m-sibType6,
                                         ...,}

M-SIBsChangedInfoBitMap ::=  SEQUENCE {
    m-SIBsChangedBitMap          BIT STRING (SIZE (N SIBs -1)),           OPTIONAL
    -- Need OP
 }

-- ASN1STOP
```

FIG. 2

```
-- ASN1START

Paging ::=                      SEQUENCE {
    pagingRecordList                PagingRecordList            OPTIONAL, -- Need ON
    systemInfoModification          ENUMERATED {true}           OPTIONAL, -- Need ON
    etws-Indication                 ENUMERATED {true}           OPTIONAL, -- Need ON
    nonCriticalExtension            Paging-v890-IEs             OPTIONAL  -- Need OP
}

Paging-v890-IEs ::=             SEQUENCE {
    lateNonCriticalExtension        OCTET STRING                OPTIONAL, -- Need OP
    nonCriticalExtension            Paging-v920-IEs             OPTIONAL  -- Need OP
}

Paging-v920-IEs ::=             SEQUENCE {
    cmas-Indication-r9              ENUMERATED {true}           OPTIONAL, -- Need ON
    nonCriticalExtension            Paging-v1130-IEs            OPTIONAL  -- Need OP
}

Paging-v1130-IEs ::=            SEQUENCE {
    eab-ParamModification-r11       ENUMERATED {true}           OPTIONAL, -- Need ON
    nonCriticalExtension            M-Paging-vXXXX-IEs          OPTIONAL  -- Need OP
}

M-Paging-vXXXX-IEs ::=          SEQUENCE {
    m-SIBsChangedBitMap             BIT STRING (SIZE (N_SIBs))
    nonCriticalExtension            SEQUENCE {}                 OPTIONAL  -- Need OP
}

PagingRecordList ::=            SEQUENCE (SIZE (1..maxPageRec)) OF PagingRecord

PagingRecord ::=                SEQUENCE {
    ue-Identity                     PagingUE-Identity,
    cn-Domain                       ENUMERATED  {ps, cs},
    ...
}

PagingUE-Identity ::=           CHOICE {
    s-TMSI                          S-TMSI,
    imsi                            IMSI,
    ...
}

IMSI ::=                        SEQUENCE (SIZE (6..21)) OF IMSI-Digit

IMSI-Digit ::=                  INTEGER (0..9)

-- ASN1STOP
```

FIG. 4

TRANSMITTING SYSTEM INFORMATION CHANGE NOTIFICATIONS TO MTC DEVICES

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 2 is abstract syntax notation (ASN) code of a machine type communication (MTC) system information block type 1 (SIB1) that includes a bitmap of updated SIBs in accordance with an example;

FIG. 4 is abstract syntax notation (ASN) code of a machine type communication (MTC) paging message that includes a bitmap of updated system information blocks (SIBs) in accordance with an example;

Figure 1:
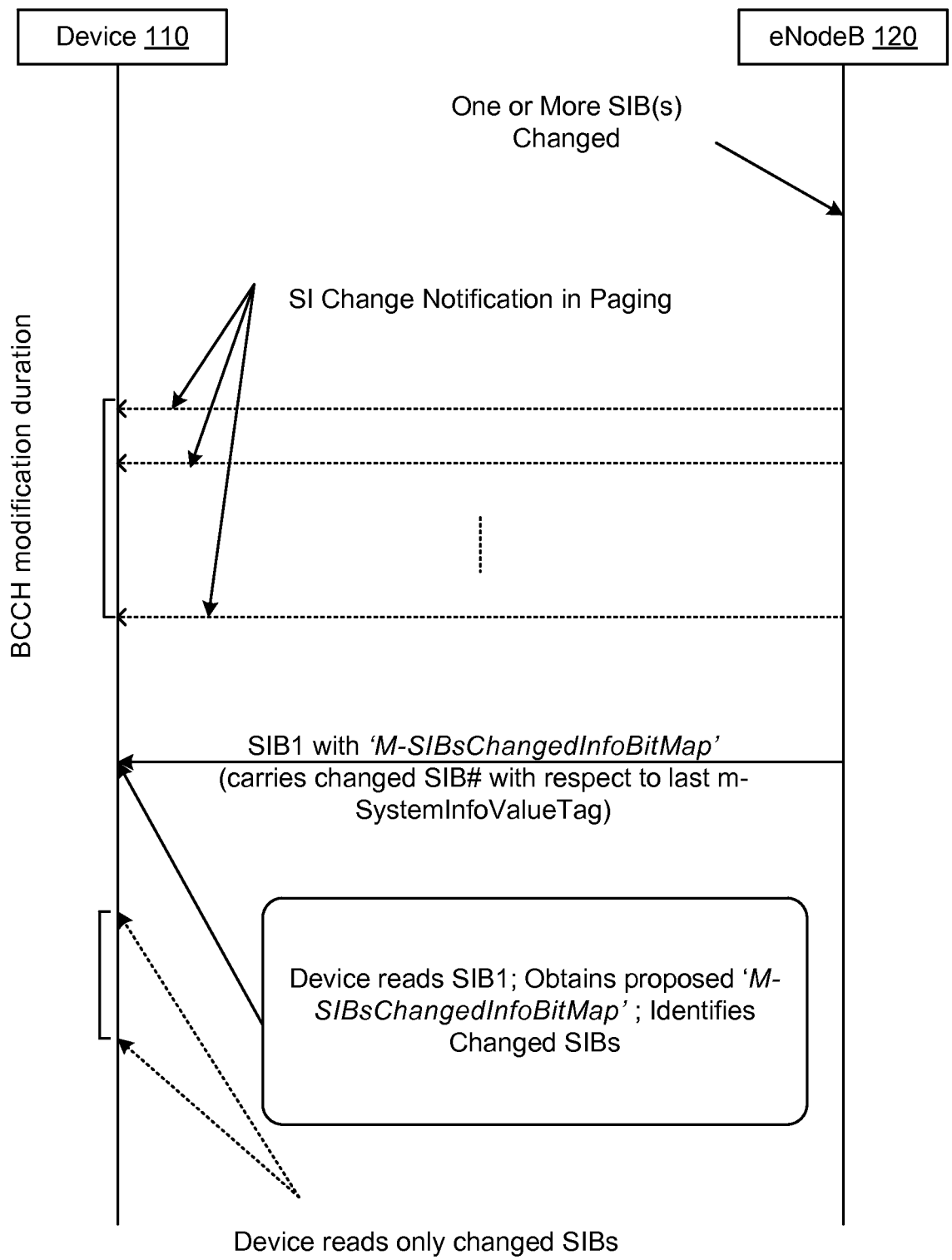
FIG. 1 illustrates a device operable to receive system information change notifications from an eNodeB in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In 3GPP LTE systems, the network (e.g., an eNodeB) can periodically broadcast system information (SI) to a plurality of devices, such as user equipments (UEs). The SI can enable the devices to access the network. The SI can include more essential information, referred to as a master information block (MIB) which is used to acquire other information from the cell, as well as other additional information, referred to as system information blocks (SIBs). The MIB can be transmitted using a broadcast channel (BCH) and carried by a physical broadcast channel (PBCH) at periodic intervals (e.g., every 10 ms). The MIB can include various types of network parameters that are most critical for the devices. The location of the MIB in time and frequency can be known to the devices. Therefore, the devices can synchronize to the network and go to that location in order to read the MIB.

The SIBs can include additional network parameters that are utilized by the devices to access the network. The SIBs (e.g., SIB1-SIB19) can be mapped on radio resource control (RRC) SI messages (e.g., SI-1, 2, 3, 4, etc.) over a downlink shared channel (DL-SCH) and transmitted using a physical downlink shared channel (PDSCH) at periodic intervals. For example, S1-1 (which contains SIB1) can be transmitted every 20 ms, but other SI message can be transmitted less frequently. Each SI message can be associated with a different transmission frequency and can be communicated in a single subframe. The specific parameters included in the MIB and each SIB (e.g., SIB1-SIB19) are further defined in 3GPP Technical Specification (TS) 36.331. In one example, a majority of devices do not utilize each SIB. For example, most devices may only utilize SIBs 1-5, while the other SIBs are used less often.

In one example, the devices that receive the SI from the network can be legacy UEs (e.g., mobile phones), or alternatively, the devices can be low cost machine type communication (LC-MTC) or enhanced coverage machine type communication (EC-MTC) devices. MTC devices can communicate (i.e., send or receive) small amounts of data (e.g., measurements) over the network. The small amount of data typically ranges from a few bits to kilobits of data. In contrast, the legacy UEs can perform voice calls, video streaming, etc.

In 3GPP LTE Release 13, the SIBs and paging messages for legacy UEs are separated from that of MTC devices. For example, a new SIB1 can be common for LC-MTC and EC-MTC devices, but a different SIB1 can be used for legacy UEs. The SIBs for MTC devices can utilize different time and frequency resources as compared to the SIBs for legacy devices. An existing SIB information element (IE) can be used for the new SIB for MTC devices, or a newly defined SIB IE can be used. In order to efficiently support cell selection and reselection, SIB1 information can be transmitted separately from other SIBs with respect to MTC devices. In one example, the SIB1 for MTC devices can include scheduling information, which can allow for the acquisition of other SIBs without reading the physical downlink control channel (PDCCH). The scheduling information can indicate time, frequency, transport block size (TBS) and modulation and coding scheme (MCS). In addition, since the SIBs can be separate for legacy UEs and MTC devices, a transport block (TB) size of a SIB for MTC devices can be restricted to 1000 bits. In contrast, the TB size of SIBs for legacy UEs can be restricted to 2200 bits.

In traditional LTE systems, if system information (SI) changes (e.g., one or more network parameters are updated), then the device can read the system information again before connecting to the network. As used herein, the term "device" can refer to either a legacy UE or a LC/EC MTC device. The device determines to reacquire the system information based on a notification received from the eNodeB. The notification can indicate that one of the SIBs has been changed with respect to a previous version of the SIB. As used herein, the term "SIB" can be a SIB that corresponds to legacy UEs or a SIB that corresponds to LC/EC MTC devices. In traditional LTE systems, the eNodeB does not specify the specific SIB that has been changed. Rather, the eNodeB provides a general notification that a change has occurred in one or more SIBs. In one example, the notification can be a one-bit value that is communicated from the eNodeB to the device via a paging message. The device can receive the paging message over a paging channel irrespective of whether the device is in connected mode or idle mode.

In response to receiving the notification from the eNodeB, the device can read a SIB1, which is broadcast periodically from the eNodeB. The location of the SIB1 in time (e.g., subframe) can be known to the device. The frequency information associated with the SIB1 can be obtained by reading a physical downlink control channel (PDCCH) that is associated with a system information radio network temporary identifier (SI-RNTI) in that subframe. In other words, the device can synchronize to the network and go to that location in order to read SIB1. In one example, SIB1 can be transmitted in subframe 5 every 20 ms. In one example, both the time and frequency can be predefined for the SIB1.

However, the device does not previously know the location for the other SIBs (e.g., SIBs 2-19). Rather, the SIB1 provides timing information (or scheduling information) for the other SIBs. More specifically, the SIB1 can include an information element (IE) that provides the scheduling information for the other SIBs. Therefore, after the device receives the notification from the eNodeB indicating that the change has occurred in one or more SIBs, the device first reads the SIB1. The device identifies the scheduling information for the other SIBs based on the contents of SIB1, and then the device reads each of the other SIBs.

In previous solutions, even if only one SIB has been changed, the device does not know the specific SIB that has been changed, so the device reads all of the SIBs again. In other words, in previous solutions, the device is likely to read a number of SIBs that have not changed since the last time the device read the SIBs, which can lead to power wastage at the device. As an example, if SIB4 changes, in accordance with previous solutions, the device can read the SIB1 and then read SIBs 2-19, even though it was only SIB4 that changed. While this solution can be acceptable for legacy UEs, MTC devices have increased power constraints as compared to legacy UEs. For MTC devices, the device wake up time is to be minimized in order to save power. Therefore, the previous solution of reacquiring all of the SIBs again is not optimal for MTC devices.

Moreover, for MTC devices, each system information (SI) message can be repeated several times (e.g., 10s to 100s of times). In other words, the transmission of multiple copies of the same SI message (e.g., multiple copies of the same SIB) can allow for aggregation of the data, and then decoding of the data at the MTC device. Since MTC device can often be located in areas with poor network conditions or low coverage (e.g., a basement), the network can provide coverage enhancement by means of signal repetition. So while a legacy UE may only use one copy of the SIB in order to decode the SIB, a MTC device may utilize the transmission of multiple copies of the same SIB. In other words, for each SIB reception, the MTC device can read multiple copies. As a result, the SIB can be transmitted more often, and the MTC device can stay awake (i.e., remain in connected mode) for a longer period of time. Furthermore, the MTC device can receive multiple copies of each SIB, so when the MTC device reads all of the SIBs again in response to receiving a system information (SI) change notification from the network, this problem can become aggregated (i.e., multiple copies for each of a plurality of SIBs results in an increased amount of signaling at the MTC device). Therefore, with previous solutions, SI acquisition and updates for MTC devices in particular can cause an increase in device power consumption.

In previous solutions, the device can read all required SIBs when the device first connects to the network. The SIBs can be valid for a maximum duration (e.g., 3 hours) provided that none of the SIBs are changed or updated during this time period. If one or more SIB(s) is/are changed, the eNodeB can send a system information (SI) change indication to the devices. More specifically, the eNodeB can send the SI change notification to the devices using a paging message that includes a system information modification (systemInfoModification) paging field. The eNodeB can send several paging indications over a broadcast control channel (BCCH) modification duration before the updated SIBs are broadcasted by the eNodeB. Although the device can be informed about changes or updated in system information via paging, the eNodeB does not provide further details regarding the system information that is changed or updated (i.e., which SIB has been changed or updated). As a result, the device can read or acquire all relevant SIBs (by reading SI messages that are associated with each SIB) even if only a single SIB has been changed, which results in significant SI acquisition overhead at the device. This SI update mechanism is very inefficient for MTC devices in particular with respect to device power, especially when MTC devices aggregate several copies of each SI message in order to decode the SI message.

Therefore, the present technology provides a solution to reduce the SI acquisition overhead at the device. The solution can be applicable to both legacy UEs and MTC devices, although this solution can be particularly useful for MTC devices due to the greater power constraints on MTC devices as compared to legacy UEs. In the present technology, in response to the SI change indication from the eNodeB, the device can read/update only the SIBs which have been changed or updated, as opposed to the device reading/updating all of the SIBs again. The eNodeB can provide novel information to the device that indicates the changed SIBs, which can enable the device to identify only the SIBs that have changed since a last SI change occasion. More specifically, the eNodeB can send 'SIBs change information' in a bitmap 'M-SIBsChangedInfoBitMap' to indicate which SIBs have been changed since the last SI change occasion. The number of bits utilized to send the bitmap is determined based a maximum number of SIBs defined for the device minus one. In one example, a device that is an MTC device may use about 3-4 SIBs, so the overhead due to the bitmap is 2-3 bits. In another example, a device that is a legacy device may utilize 19 SIBs, so the overhead due to the bitmap is 18 bits. In some cases, the number of SIBs defined for the device may change over time, so the overhead due to the bitmap can be dependent on the number of SIBs defined for the device.

As explained in greater detail below, the field 'M-SIBsChangedInfoBitMap' can indicate the SIB numbers which have been changed since a previous m-SystemInfoValueTag, i.e., the SIBs which have been changed after m-SystemInfoValueTag=(current m-SystemInfoValueTag−1). The eNodeB can send the bitmap in a SIB1 message or in a paging message that is designated for MTC devices, or alternatively, the eNodeB can send the bitmap in a SIB1 message or in a paging message that is designated for legacy UEs. The device can read only the SIBs which have been changed based on the bitmap received from the eNodeB. By avoiding the acquisition of unchanged SIBs, the device can save device power since the device can be awake for a reduced amount of time.

FIG. 1 is an example of a device 110 operable to receive system information (SI) change notifications from a network element, such as an eNodeB 120. In one example, the device 110 can be a legacy user equipment (UE), such as a mobile phone, or the device 110 can be a low cost machine type communication (LC-MTC) or enhanced coverage machine type communication (EC-MTC) device. MTC devices can communicate (i.e., send or receive) small amounts of data to the eNodeB 120. The small amount of data typically ranges from a few bits to kilobits of data. In contrast, legacy UEs can perform voice calls, video streaming, etc.

In one configuration, the eNodeB 120 can detect when a change or update occurs to a system information block (SIB). SIBs can include various network parameters that allow the device 110 to communicate with the eNodeB 120. If one or more network parameters in one or more SIBs are updated or changed, then the eNodeB 120 can detect that the update or change has occurred. The SIB can be a MTC SIB that is designated for an MTC device, or alternatively, the SIB can be a legacy SIB that is designated for a legacy UE. In other words, the SIBs can be separate for MTC devices and legacy UEs. In addition, the number of SIBs that are configured for the device 110 can depend on whether the device 110 is a legacy UE or an MTC device. For example, an MTC device can utilize approximately four SIBs, whereas a legacy UE can utilize approximately 19 SIBs. In another example, the MTC device and the legacy UE can each utilize an alternative number of SIBs.

After the eNodeB 120 detects that one or more SIBs have been changed or updated, the eNodeB 120 can send the SI change notification to the device 110. More specifically, when one or more SIBs are changed, the eNodeB 120 can send the SI change indication to the device 110 via a paging message that includes a system information modification (systemInfoModification) paging field. The device 110 can read paging messages on a paging channel when the device 110 is in connected mode or idle mode. In one example, several paging indications can be sent to the device 110 for a period 'BCCH modification duration' before updated SIBs are broadcasted by the eNodeB 120.

In one example, the device 110 can receive the SI change notification in the paging message from the eNodeB 120. Based on the SI change notification, the device 110 can read a SIB1, which is broadcast periodically from the eNodeB 120. For example, the SIB1 can be broadcast every 20 milliseconds (ms) from the eNodeB 120. The location of the SIB1 in time can be previously known to the device 110. In other words, the device 110 can synchronize to the network and go to that location in order to read the SIB1.

In one example, the SIB1 can include information on specific SIBs that have changed since a last SI change notification. More specifically, 'SIBs change information' in the SIB1 can be a bitmap that indicates which SIBs have been changed since the last SI change occasion. In one example, a novel information element (IE) or field, referred to as "m-SIBsChangedBitMap," can be added to the SIB1 message to carry the information about the changed SIBs. In one example, the size of the bitmap can depend on whether the SIBs are designated for legacy UEs or MTC devices. For example, the size of the bitmap can be greater when the SIBs are designated for legacy UEs as opposed to MTC devices.

As a non-limiting example, the "m-SIBsChangedBitMap" field can indicate that SIB3 and SIB7 have changed since the last SI change occasion. Therefore, based on the "m-SIBsChangedBitMap" field, the device 110 can determine that only SIB3 and SIB7 have changed and, for example, SIB2, SIBs 4-6 and SIBs 8-19 have not changed since the last SI change occasion. Therefore, the device 110 can know that the device's information on SIB2, SIBs 4-6 and SIBs 8-19 are current, whereas the device's information on SIB3 and SIB7 is outdated.

In one example, the SIB1 received from the eNodeB 120 can be associated with a system information value tag (m-SystemInfoValueTag). The system information value tag can refer to a version number of the SIB1 that is received from the eNodeB 120. In other words, the system information value tag can indicate an age or version number of the SIB1.

The device 110 can read the SIB1 and compare a current value of 'm-SystemInfoValueTag' in the SIB1 received from the eNodeB 120 with the 'm-SystemInfoValueTag' stored at device 110. The current 'm-SystemInfoValueTag' stored at the device 110 can be associated with the last SIB1 received at the device 110 from the eNodeB 120. If the stored m-SystemInfoValueTag at the device 110 equals (current m-SystemInfoValueTag−1), then the device 110 can read the 'M-SIBsChangedInfoBitMap' field from the SIB1. The 'M-SIBsChangedInfoBitMap' field can indicate the SIB numbers which have been changed since the previous m-SystemInfoValueTag, i.e., the SIBs changed after m-SystemInfoValueTag equals (current m-SystemInfoValueTag−1).

In other words, if a version number of the SIB1 received from the eNodeB 120 does not equal a version number stored at the device 110 (i.e., a version number of the previous SIB1 received at the device 110), then the device 110 knows that one or more SIBs at the device 110 are outdated. Therefore, the device 110 can read the bitmap in order to identify the specific SIBs that are outdated.

As a non-limiting example, the version number of the SIB1 received from the eNodeB 120 can be 49. The device 110 can compare version number 49 to a version number stored at the device 110 which is, for example, version number 48. Based on this comparison of version numbers, the device 110 can determine that the SIB1 previously received at the device 110 (i.e., version number 48) is outdated and one or more SIBs have been updated since that time. Therefore, the device 110 can read the bitmap included in the SIB1 in order to identify the specific SIBs that have been updated.

In one example, the device 110 can obtain scheduling information in the SIB1 for only those SIBs which have been changed since the last SI change occasion. In other words, the device 110 can obtain scheduling information in the SIB1 for only those SIBs which have been indicated as changed SIBs in the 'M-SIBsChangedInfoBitMap' field. Based on the scheduling information, the device 110 can read or acquire only these SIBs. The device 110 may not read or acquire the SIBs that were not indicated as changed SIBs in the 'M-SIBsChangedInfoBitMap' field. As a result, the device 110 does not unnecessarily have to read SIBs that have not changed or been updated since the last SI change occasion. In other words, the device 110 does not have to read SIBs containing information that is already known to the device 110. Rather, the device 110 can only read SIBs containing changed or updated information.

In one example, if the 'M-SIBsChangedInfoBitMap' field is not present in the SIB1, then the device 110 can acquire all relevant SIBs that are utilized for that device 110, as in legacy LTE systems. In other words, the device 110 can receive the SI change notification from the eNodeB 120 in the paging message. Then, the device 110 can read the SIB1 to obtain scheduling information for all of the SIBs. However, if the SIB1 does not indicate the specific SIBs that have changed since the last SI change occasion, then the device 110 can read all of the SIBs, irrespective of which specific SIBs have changed since the last SI change occasion.

In one configuration, the device 110 can compare the current value of 'm-SystemInfoValueTag' in the SIB1 received from the eNodeB 120 with the 'm-SystemInfoValueTag' stored at device 110, and if the stored m-SystemInfoValueTag at the device 110 is less than (current m-SystemInfoValueTag−1), the device 110 can acquire all the SIBs. The device 110 can acquire all of the SIBs irrespective of the presence of the 'M-SIBsChangedInfoBitMap' field. As a non-limiting example, if the version number of the SIB1 received from the eNodeB 120 is 33 and the version number stored at the device 110 is 31, then the device 110 can acquire all of the SIBs.

In one configuration, the SIBs stored at the device 110 can become invalid after a predefined validity duration. For example, the SIBs can become invalid after 3 hours for legacy UEs, but the predefined validity duration can be higher for MTC devices (e.g., 6 hours). The device 110 can reacquire the SIBs if the m-SystemInfoValueTag has changed during the predefined validity duration, or the device 110 can re-validate the SIBs if the m-SystemInfoValueTag has not changed at the end of the predefined validity duration.

In one example, the device 110 can read the SIB1 after expiry of the predefined validity duration (e.g., 6 hours). The device 110 can compare a current value of 'm-SystemInfoValueTag' in the SIB1 with a 'm-SystemInfoValueTag' stored at the device 110. If the stored m-SystemInfoValueTag at the device 110 equals the current m-SystemInfoValueTag, then the stored SIBs are validated at the device 110 for the next predefined validity duration (e.g., another 6 hours). In this case, none of the SIBs have been changed or updated since the last SI change occasion, so therefore, the device 110 does not have to reacquire any of the SIBs. The device 110 can obtain significant power savings by not reacquiring the SIBs, especially when the SIBs that were previously read by the device 110 are still up to date.

In one example, the device 110 can compare the current value of 'm-SystemInfoValueTag' in the SIB1 acquired after expiry of the predefined validity duration (e.g., 6 hours) with the 'm-SystemInfoValueTag' stored at the device 110, and if the stored m-SystemInfoValueTag at the device 110 equals (current m-SystemInfoValueTag−1), the device 110 can read the 'M-SIBsChangedInfoBitMap' field in the SIB1. The 'M-SIBsChangedInfoBitMap' field can indicate the SIB numbers which have been changed since the previous m-SystemInfoValueTag, i.e., the SIBs changed after the m-SystemInfoValueTag equals (current m-SystemInfoValueTag−1). The device 110 can obtain scheduling information for only those SIBs which have been indicated as changed SIBs in the 'M-SIBsChangedInfoBitMap' field, and the device 110 can only acquire these SIBs.

In one example, the 'm-SIBsChangedBitMap' field in the SIB does not indicate any change to the SIB1. Therefore, the number of bits used for the bitmap can be equal to the number of SIBs configured for the device 110 minus one, wherein the number of SIBs configured for the device 110 can vary depending on whether the device 110 is an MTC device or a legacy UE.

In one example, if the 'M-SIBsChangedInfoBitMap' field is not present in the SIB1 acquired after expiry of the predefined validity duration (e.g., 6 hours), then the device 110 can acquire all relevant SIBs for that device 110, as in legacy LTE systems. In another example, of the stored m-SystemInfoValueTag at the device 110 is less than the (current m-SystemInfoValueTag−1), the device 110 can acquire all of the SIBs irrespective of a presence of the 'M-SIBsChangedInfoBitMap' field in the SIB1.

FIG. 2 is an example of abstract syntax notation (ASN) code of a machine type communication (MTC) system information block type 1 (SIB1) that includes a bitmap of updated SIBs. The MTC SIB1 can be communicated from a network node (e.g., an eNodeB) to a device, such as a machine type communication (MTC) device. MTC SIBs can be separate from legacy SIBs for legacy UEs. The MTC SIB1 can include several information elements (IEs) that include a prefix 'm', which indicate that these IEs are defined for MTC SIB1. These IEs can be newly defined IEs or similar to IEs in a legacy SIB1 for legacy UEs. As shown in FIG. 2, the MTC SIB1 can include a 'SIBs Changed Bitmap' parameter (m-SIBsChangedBitMap), a 'SIB mapping information' parameter (m-SIB-MappingInfo), an 'SI periodicity' parameter (m-SI-Periodicity), a 'SI window length' parameter (m-SI-WindowLength), and a 'system information value tag' parameter (m-SystemInfoValueTag).

In one example, the 'SIBs Changed Bitmap' parameter (m-SIBsChangedBitMap) is a field in the SIB1 that indicates the SIB numbers which have been changed since a previous m-SystemInfoValueTag, i.e., the SIBs changed after m-SystemInfoValueTag=(current m-SystemInfoValueTag−1). Within the m-SIBsChangedBitMap field, N_SIBs is equal to the number of SIBs for MTC. The device can acquire only those SIBs which have been changed, as indicated in the m-SIBsChangedBitMap field, after the device receives a system information (SI) change indication in a paging message. In one example, if the m-SIBsChangedBitMap field is not present in the MTC SIB1, then the device can acquire all of the SIBs. In another example, if the stored m-SystemInfoValueTag at the device is less than (current m-SystemInfoValueTag−1), then the device can acquire all of the SIBs irrespective of the presence of the 'M-SIBsChangedInfoBitMap' field in the SIB1.

In one example, the 'SIB mapping information' parameter (m-SIB-MappingInfo) is a list of SIBs that are mapped to a system information (SystemInformation) message. In one example, there is no mapping information of SIB2, since SIB2 is present in a first system information message that is listed in a scheduling information list (schedulingInfoList).

In one example, the 'SI periodicity' parameter (m-SIPeriodicity) can indicate a periodicity of the SI-message (in radio frames). For example, a value of 'rf8' denotes 8 radio frames, a value of 'rf16' denotes 16 radio frames, and so on.

In one example, the 'SI window length' parameter (m-SIWindowLength) can indicate a common SI scheduling window for all SIs. The 'SI window length' parameter can be provided in terms of milliseconds. For example, 'ms1' denotes 1 millisecond, 'ms2' denotes 2 milliseconds and so on.

In one example, the 'system information value tag' parameter (m-SystemInfoValueTag) indicates a value tag that is common for all SIBs, other than MIB, SIB1, SIB10, SIB11, SIB12 and SIB14. In one example, a change in the MIB or the SIB1 can be detected by acquisition of a corresponding message.

Figure 3:
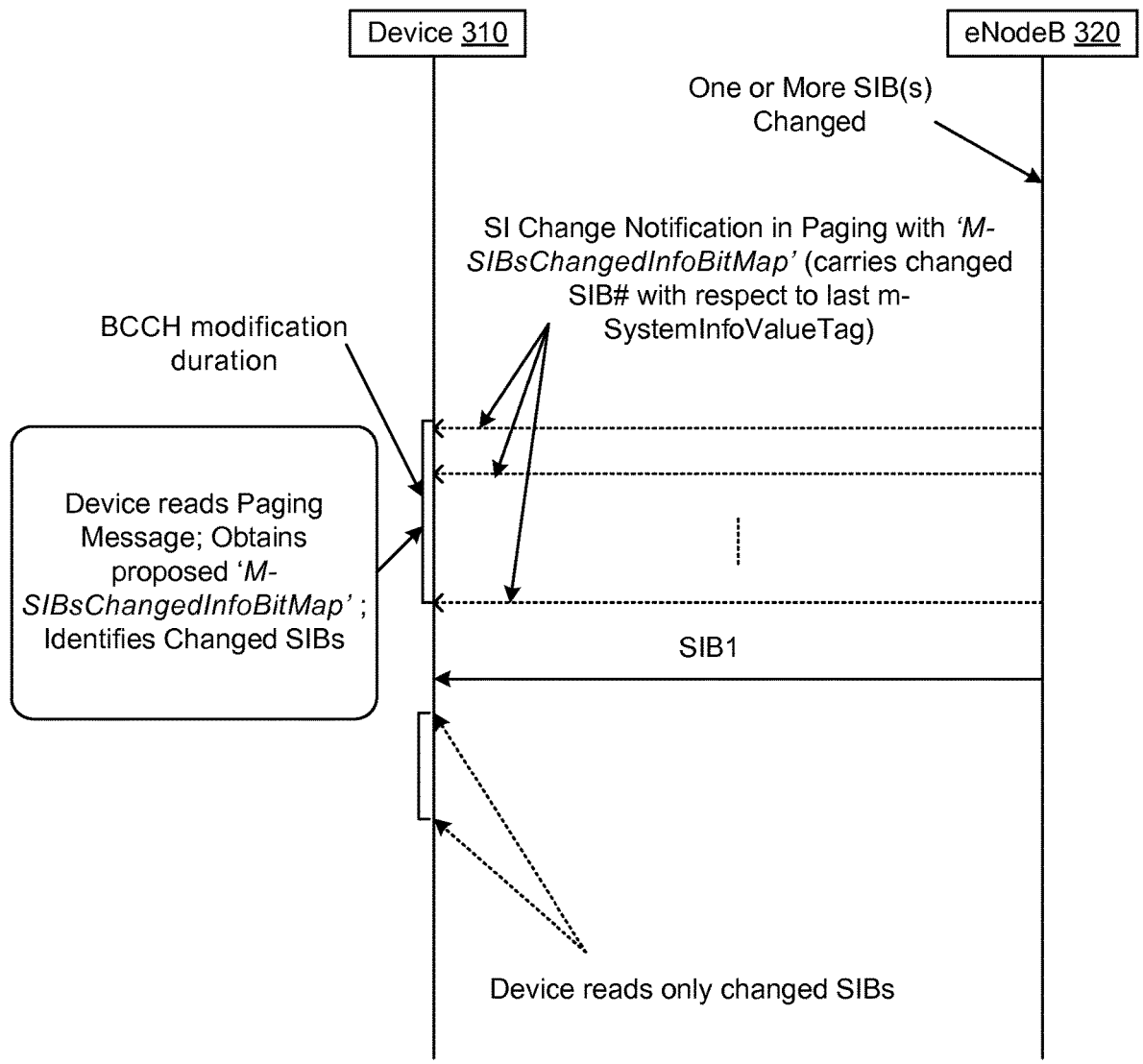
FIG. 3 illustrates a device operable to receive system information change notifications from an eNodeB in accordance with an example.

FIG. 3 is an example of a device 310 operable to receive system information (SI) change notifications from a network element, such as an eNodeB 320. In one example, the device 310 can be a legacy user equipment (UE), such as a mobile phone, or the device 310 can be a low cost machine type communication (LC-MTC) or enhanced coverage machine type communication (EC-MTC) device. MTC devices can communicate (i.e., send or receive) small amounts of data to the eNodeB 320, whereas legacy UEs can perform voice calls, video streaming, etc.

In one configuration, the eNodeB 320 can detect when a change or update occurs to a system information block (SIB). SIBs can include various network parameters that allow the device 310 to communicate with the eNodeB 320. If one or more network parameters in one or more SIBs are updated or changed, then the eNodeB 320 can detect that the update or change has occurred.

After the eNodeB 320 detects that one or more SIBs have been changed or updated, the eNodeB 320 can send the SI change notification to the device 310. More specifically, when one or more SIBs are changed, the eNodeB 320 can send the SI change indication to the device 310 via a paging message that includes a system information modification (systemInfoModification) paging field. In one example, several paging indications can be sent to the device 310 for a period 'BCCH modification duration' before updated SIBs are broadcasted by the eNodeB 320.

In one example, the paging message can include the SI change notification, as well as 'SIBs change information' on specific SIBs that have changed since a last SI change notification. More specifically, 'SIBs change information' in the paging message can be a bitmap that indicates which SIBs have been changed since the last SI change occasion. In one example, a novel information element (IE) or field, referred to as "m-SIBsChangedBitMap," can be added to the paging message to carry the information about the changed SIBs.

In one example, after receiving the paging message that includes the SI change notification and the 'SIBs change information', the device 310 can read the SIB1. The SIB1 can be broadcast periodically from the eNodeB 320 (e.g., every 20 ms). The location of the SIB1 in time can be previously known to the device 310. In other words, the device 310 can synchronize to the network and go to that location in order to read the SIB1.

In one example, the SIB1 received from the eNodeB 320 can be associated with a system information value tag (m-SystemInfoValueTag). The system information value tag can refer to a version number of the SIB1 that is received from the eNodeB 320.

In one example, the device 310 can read the SIB1 and compare a current value of 'm-SystemInfoValueTag' in the SIB1 received from the eNodeB 320 with the 'm-SystemInfoValueTag' stored at device 310. The current 'm-SystemInfoValueTag' stored at the device 310 can be associated with the last SIB1 received at the device 310 from the eNodeB 320. If the stored m-SystemInfoValueTag at the device 310 equals (current m-SystemInfoValueTag−1), then the device 310 can obtain scheduling information in the SIB1 for only those SIBs which have been changed since the last SI change occasion. In other words, the device 310 can obtain scheduling information in the SIB1 for only those SIBs which have been indicated as changed SIBs in the 'M-SIBsChangedInfoBitMap' field. Based on the scheduling information, the device 310 can read or acquire only these SIBs. The device 310 may not read or acquire the SIBs that were not indicated as changed SIBs in the 'M-SIBsChangedInfoBitMap' field. As a result, the device 310 does not unnecessarily have to read SIBs that have not changed or been updated since the last SI change occasion, thereby prevent unnecessary signaling and power consumption at the device 310.

In one example, some SIBs may not be applicable to the device 310. The device 310 can receive the paging message from the eNodeB 320, wherein the paging message includes the SI change notification and the specific SIBs that have been changed. If the device 310 determines that the specific SIBs that have been changed are not applicable to the device 310 (i.e., the specific SIBs that have been changed are not utilized by the device 310), then the device 310 can ignore the SI change notification in the paging message. As a non-limiting example, the paging message can indicate that SIB15 has been changed, but if the device 310 does not utilize SIB15, then the device 310 can ignore the SI change notification in the paging message.

In one example, the 'm-SIBsChangedInfoBitMap' field in the paging message does not indicate any change to the SIB1. Therefore, the number of bits used for the bitmap can be equal to the number of SIBs configured for the device 310 minus one, wherein the number of SIBs configured for the device 310 can vary depending on whether the device 310 is an MTC device or a legacy UE.

In one example, if the 'M-SIBsChangedInfoBitMap' field is not present in the paging message, then the device 310 can acquire all relevant SIBs that are utilized for that device 310, as in legacy LTE systems.

In one configuration, the device 310 can compare the current value of 'm-SystemInfoValueTag' in the SIB1 received from the eNodeB 320 with the 'm-SystemInfoValueTag' stored at device 310, and if the stored m-SystemInfoValueTag at the device 310 is less than (current m-SystemInfoValueTag−1), the device 310 can acquire all the SIBs. The device 310 can acquire all of the SIBs irrespective of the presence of the 'M-SIBsChangedInfoBitMap' field in the paging message.

FIG. 4 is an example of abstract syntax notation (ASN) code of a machine type communication (MTC) paging message that includes a bitmap of updated system information blocks (SIBs). The MTC paging message can be communicated from a network node (e.g., an eNodeB) to a device, such as a machine type communication (MTC) device. MTC paging messages can be separate from legacy paging messages for legacy UEs. As shown in FIG. 4, the MTC paging message can include a Commercial Mobile Alert System (CMAS) indication parameter (cmas-Indication), a core network (CN) domain parameter (cn-Domain), an extended access barring (EAB) parameter modification parameter (eab-ParamModification), an Earthquake and Tsunami Warning System (ETWS) indication parameter (etws-Indication), an international mobile subscriber identity (IMSI) parameter (Imsi), a system information modification parameter (systemInfoModification), a UE identity parameter (ue-Identity), and a 'SIBs Changed Bitmap' parameter (m-SIBsChangedBitMap).

In one example, the CMAS indication parameter (cmas-Indication), if present, can provide an indication of a CMAS notification. In one example, the CN domain parameter (cn-Domain) can indicate an origin of the paging message. In one example, the EAB parameter modification parameter (eab-ParamModification), if present, can provide an indication of an EAB parameters (SIB14) modification. In one example, the ETWS parameter (etws-Indication), if present, can provide an indication of an ETWS primary notification and/or an ETWS secondary notification. In one example, the IMSI parameter is a globally unique permanent subscriber identity, as further described in 3GPP TS 23.003. In the IMSI, a first element contains a first IMSI digit, a second element contains a second IMSI digit, and so on. In one example, the system information modification parameter (systemInfoModification), if present, can provide an indication of a BCCH modification other than SIB10, SIB11, SIB12 and SIB14. In one example, the UE identity parameter (ue-Identity) can provide a non-access stratum (NAS) identity of the device that is being paged.

In one example, the 'SIBs Changed Bitmap' parameter (m-SIBsChangedBitMap) is a field in the MTC paging message that indicates the SIB numbers which have been changed since a previous m-SystemInfoValueTag, i.e., the SIBs changed after m-SystemInfoValueTag=(current m-SystemInfoValueTag−1). Within the m-SIBsChangedBitMap field, N_SIBs is equal to the number of SIBs for MTC. The device can acquire only those SIBs which have been changed, as indicated in the m-SIBsChangedBitMap field, after the device receives a system information (SI) change indication in a paging message. In one example, if the m-SIBsChangedBitMap field is not present in the paging message, then the device can acquire all of the SIBs. In another example, if the stored m-SystemInfoValueTag at the device is less than (current m-SystemInfoValueTag−1), then the device can acquire all of the SIBs irrespective of the presence of the 'M-SIBsChangedInfoBitMap' field in the paging message.

In one configuration, after the eNodeB sends a system information (SI) change notification to a MTC device, the eNodeB can send information on specific SIB(s) that have been changed since a last SI change occasion through a SIB1. The eNodeB can send the SI change notification to the MTC device using a paging message. Then, the eNodeB can send details of 'SIBs change information' in a MTC SIB1 message. More specifically, the 'SIBs change information' can be a bitmap that indicates which SIBs have been changed since the last SI change occasion. In one example, a novel information element (IE) or field, referred to as "m-SIBsChangedBitMap," can be added to the MTC SIB1 message to carry the information about the changed SIBs. After receiving the SI change notification in the paging message, the MTC device can read the MTC SIB1 message and obtain details of the SIBs change information from the "m-SIBsChangedBitMap" field of the MTC SIB1 message. The MTC device can identify scheduling information from the MTC SIB1 message for only the SIBs that have been changed since the last SI change occasion, and then the MTC device can read/acquire only those SIBs.

In an alternative configuration, the eNodeB can send a MTC paging message to the MTC device, wherein the MTC paging message includes a system information (SI) change notification as well as information on specific SIB(s) that have been changed since a last SI change occasion. In other words, the eNodeB can send details of 'SIBs change information' along with the SI change notification in the MTC paging message. More specifically, the 'SIBs change information' can be a bitmap that indicates which SIBs have been changed since the last SI change occasion. In one example, a novel information element (IE) or field, referred to as "m-SIBsChangedBitMap," can be added to the MTC paging message to carry the information about the changed SIBs. The MTC device can receive the MTC paging message, which includes the SI change notification as well as SIBs change information from the "m-SIBsChangedBitMap" field of the MTC paging message. Then, the MTC device can read a MTC SIB1 message to obtain scheduling information for only the SIBs that have been changed since the last SI change occasion. The MTC device can read/acquire only those SIBs that have been changed since the last SI change occasion.

Figure 5:
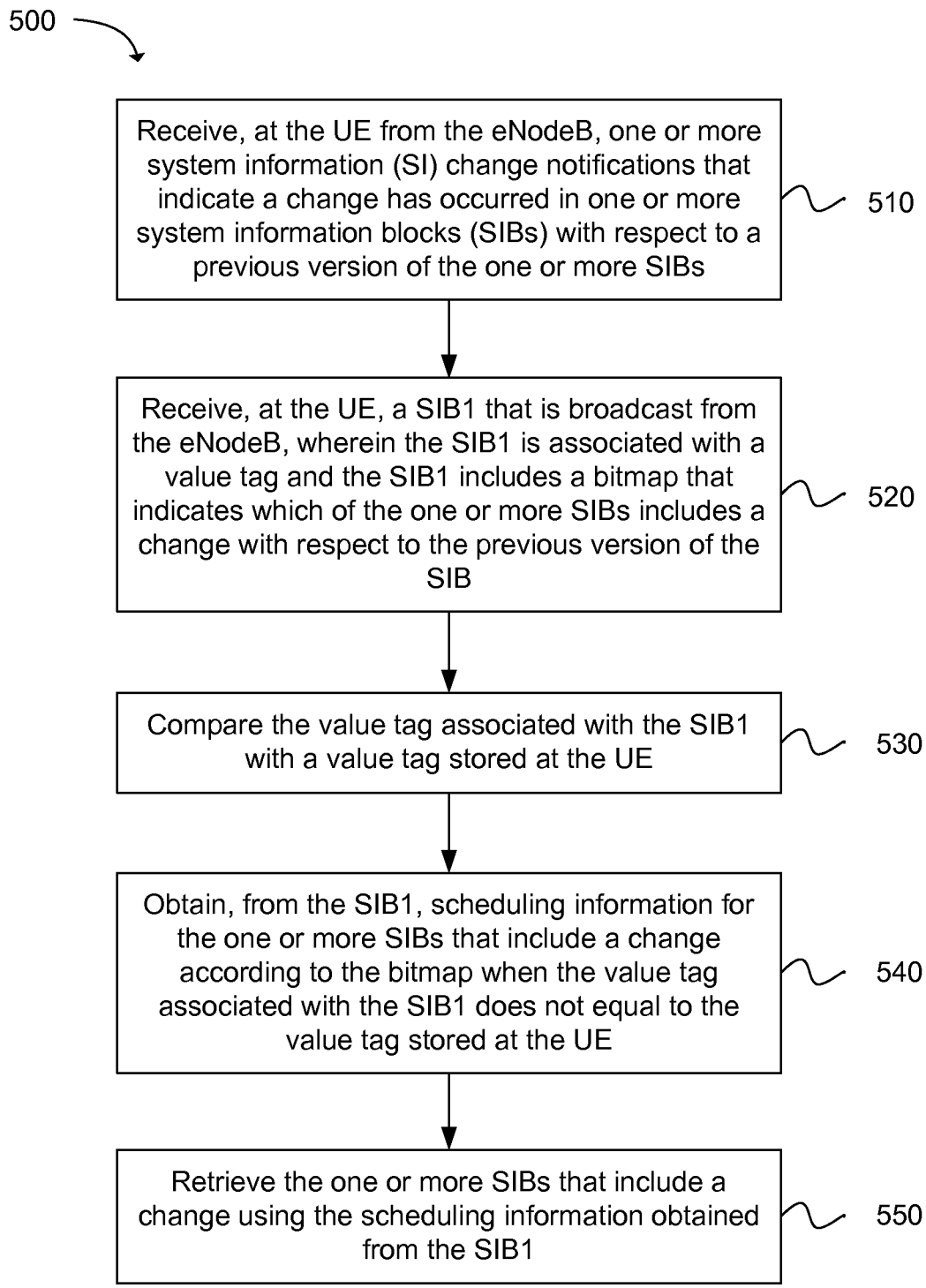
FIG. 5 depicts functionality of a user equipment (UE) operable to receive system information change notifications from an eNodeB in accordance with an example.

Another example provides functionality 500 of a user equipment (UE) operable to receive system information change notifications from an eNodeB, as shown in the flow chart in FIG. 5. The functionality can be implemented as a method or the functionality can be executed as instructions on a machine, where the instructions are included on at least one computer readable medium or one non-transitory machine readable storage medium. The UE can comprise one or more processors and memory configured to: receive, at the UE from the eNodeB, one or more system information (SI) change notifications that indicate a change has occurred in one or more system information blocks (SIBs) with respect to a previous version of the one or more SIBs, as in block 510. The UE can comprise one or more processors and memory configured to: receive, at the UE, a SIB1 that is broadcast from the eNodeB, wherein the SIB1 is associated with a value tag and the SIB1 includes a bitmap that indicates which of the one or more SIBs includes a change with respect to the previous version of the SIB, as in block 520. The UE can comprise one or more processors and memory configured to: compare the value tag associated with the SIB1 with a value tag stored at the UE, as in block 530. The UE can comprise one or more processors and memory configured to: obtain, from the SIB1, scheduling information for the one or more SIBs that include a change according to the bitmap when the value tag associated with the SIB1 does not equal to the value tag stored at the UE, as in block 540. The UE can comprise one or more processors and memory configured to: retrieve the one or more SIBs that include a change using the scheduling information obtained from the SIB1, as in block 550.

Figure 6:
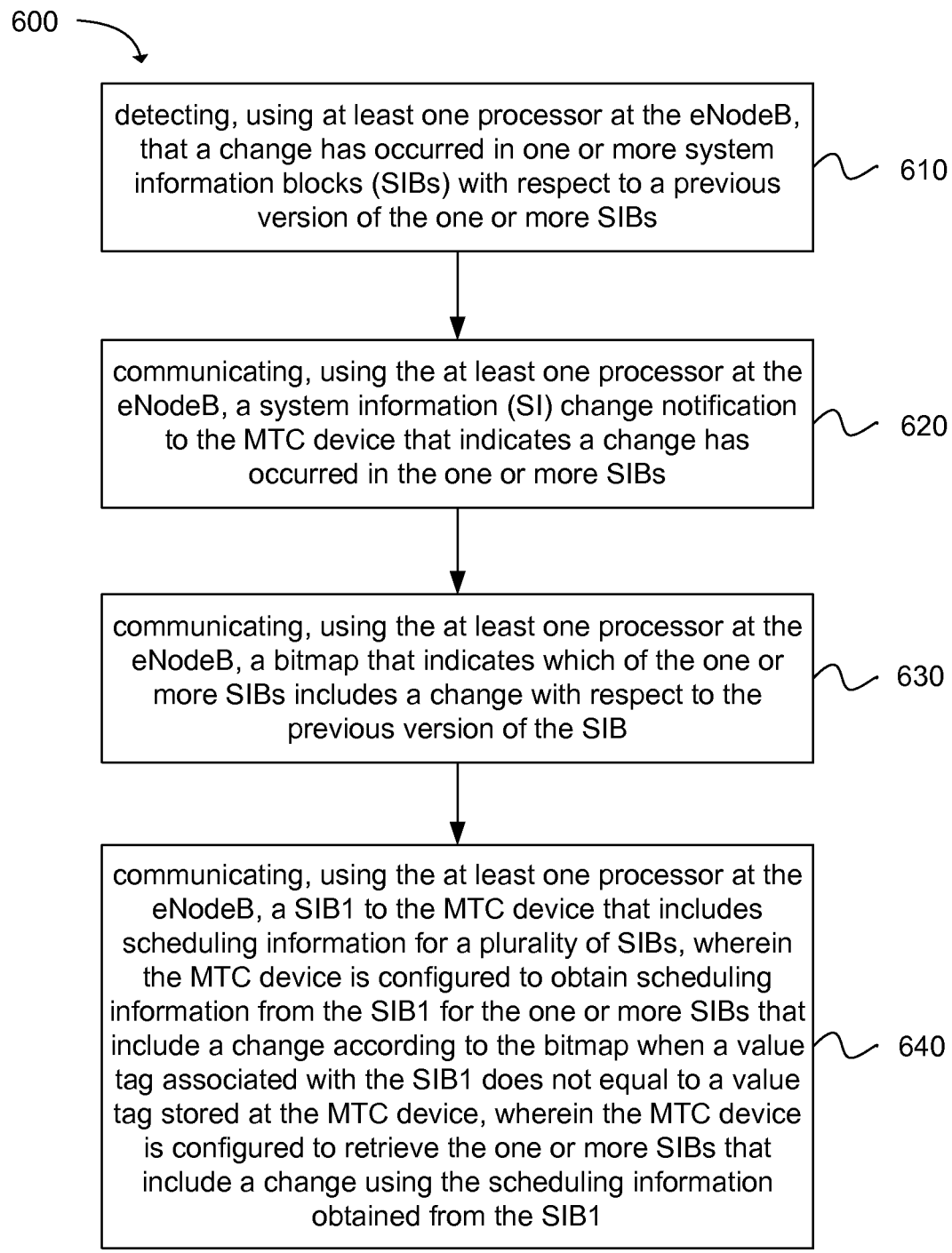
FIG. 6 depicts a flowchart of a machine readable storage medium having instructions embodied thereon for communicating system information change notifications from an eNodeB to a machine type communication (MTC) device in accordance with an example.

Another example provides at least one machine readable storage medium having instructions 600 embodied thereon for communicating system information change notifications from an eNodeB to a machine type communication (MTC) device, as shown in the flow chart in FIG. 6. The instructions can be executed on a machine, where the instructions are included on at least one computer readable medium or one non-transitory machine readable storage medium. The instructions when executed perform: detecting, using at least one processor at the eNodeB, that a change has occurred in one or more system information blocks (SIBs) with respect to a previous version of the one or more SIBs, as in block 610. The instructions when executed perform: communicating, using the at least one processor at the eNodeB, a system information (SI) change notification to the MTC device that indicates a change has occurred in the one or more SIBs, as in block 620. The instructions when executed perform: communicating, using the at least one processor at the eNodeB, a bitmap that indicates which of the one or more SIBs includes a change with respect to the previous version of the SIB, as in block 630. The instructions when executed perform: communicating, using the at least one processor at the eNodeB, a SIB1 to the MTC device that includes scheduling information for a plurality of SIBs, wherein the MTC device is configured to obtain scheduling information from the SIB1 for the one or more SIBs that include a change according to the bitmap when a value tag associated with the SIB1 does not equal to a value tag stored at the MTC device, wherein the MTC device is configured to retrieve the one or more SIBs that include a change using the scheduling information obtained from the SIB1, as in block 640.

Figure 7:
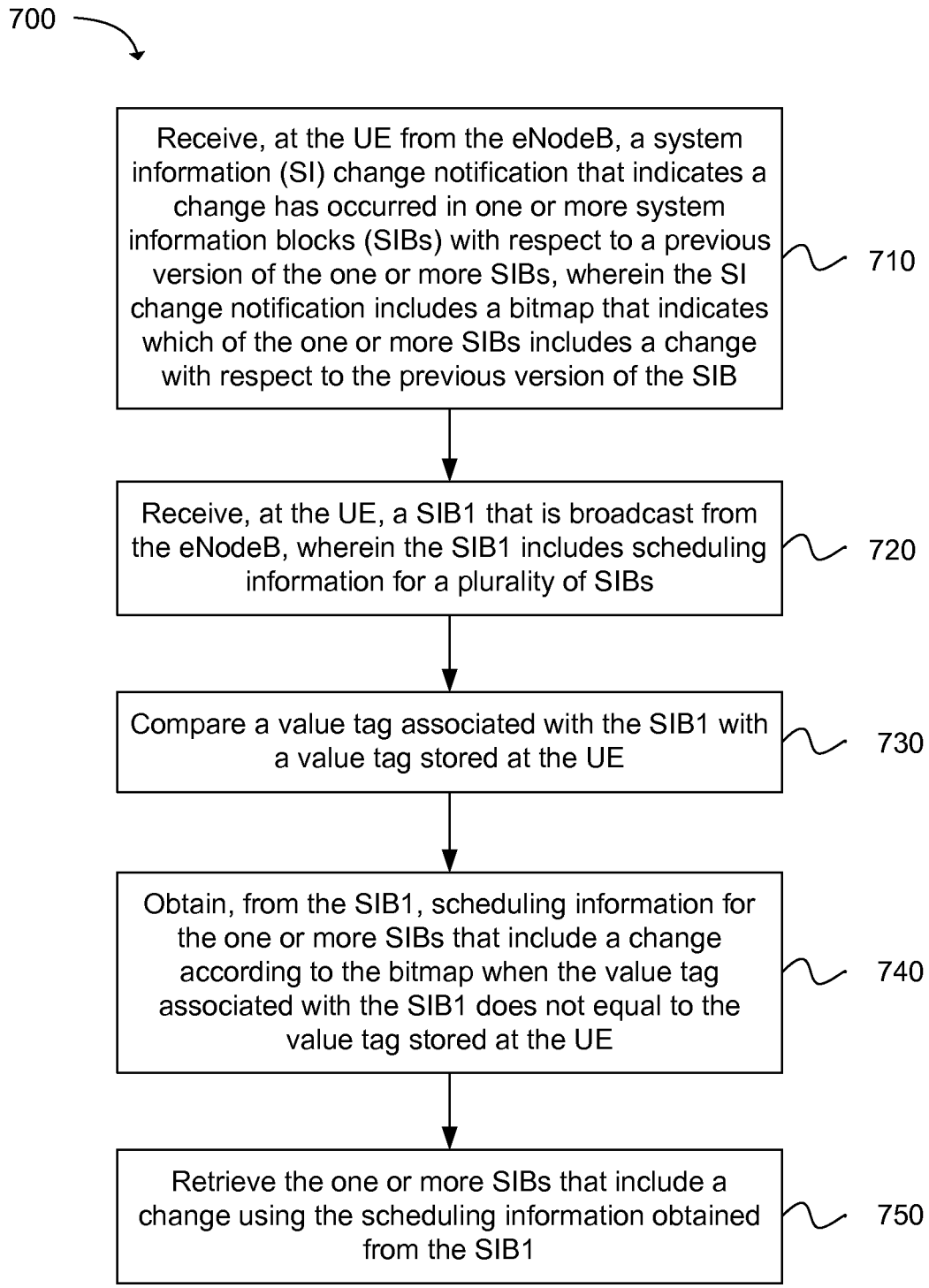
FIG. 7 depicts functionality of a user equipment (UE) operable to receive system information change notifications from an eNodeB in accordance with an example.

Another example provides functionality 700 of a user equipment (UE) operable to receive system information change notifications from an eNodeB, as shown in the flow chart in FIG. 7. The functionality can be implemented as a method or the functionality can be executed as instructions on a machine, where the instructions are included on at least one computer readable medium or one non-transitory machine readable storage medium. The UE can comprise one or more processors and memory configured to: receive, at the UE from the eNodeB, a system information (SI) change notification that indicates a change has occurred in one or more system information blocks (SIBs) with respect to a previous version of the one or more SIBs, wherein the SI change notification includes a bitmap that indicates which of the one or more SIBs includes a change with respect to the previous version of the SIB, as in block 710. The UE can comprise one or more processors and memory configured to: receive, at the UE, a SIB1 that is broadcast from the eNodeB, wherein the SIB1 includes scheduling information for a plurality of SIBs, as in block 720. The UE can comprise one or more processors and memory configured to: compare a value tag associated with the SIB1 with a value tag stored at the UE, as in block 730. The UE can comprise one or more processors and memory configured to: obtain, from the SIB1, scheduling information for the one or more SIBs that include a change according to the bitmap when the value tag associated with the SIB1 does not equal to the value tag stored at the UE, as in block 740. The UE can comprise one or more processors and memory configured to: retrieve the one or more SIBs that include a change using the scheduling information obtained from the SIB1, as in block 750.

Figure 8:
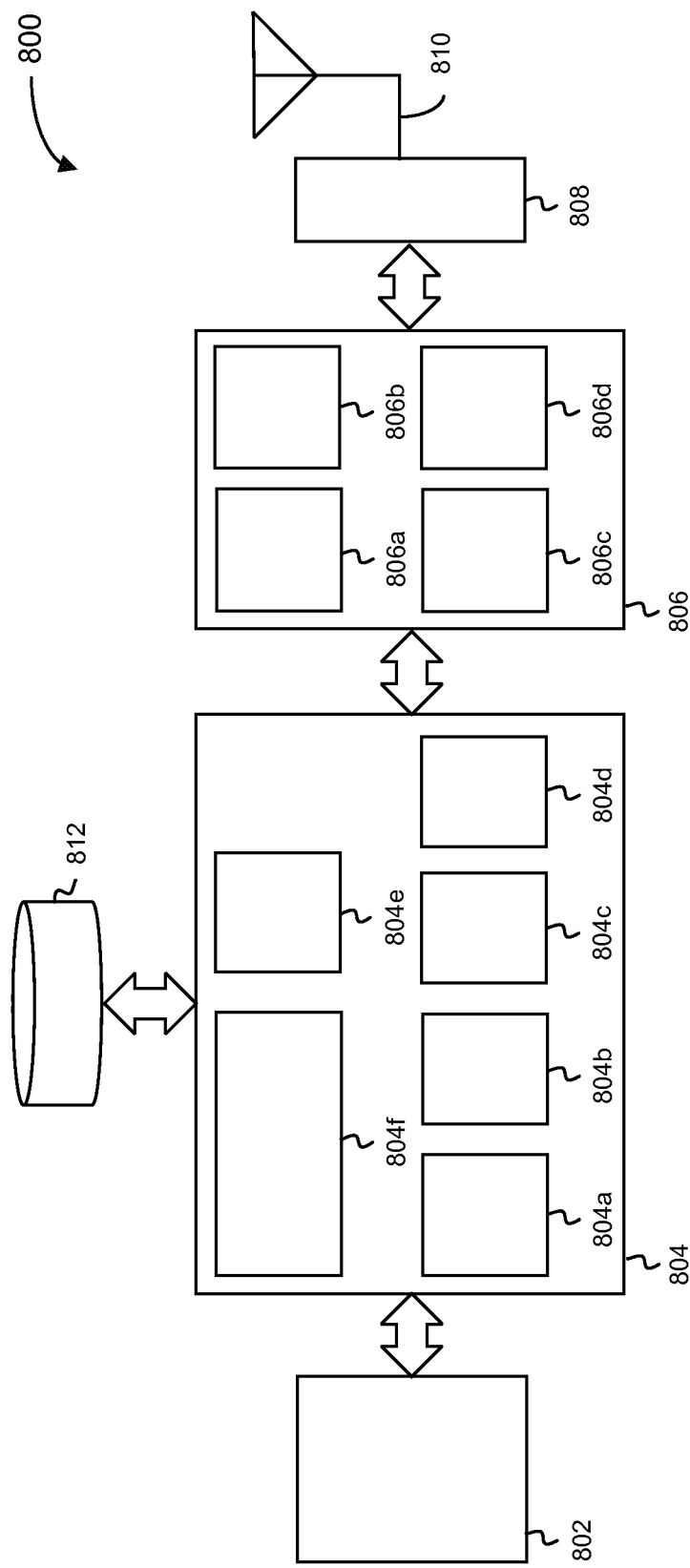
FIG. 8 illustrates a diagram of a wireless device (e.g., UE) in accordance with an example.

FIG. 8 provides an example illustration of a user equipment (UE) device 800, such as a wireless device, a mobile station (MS), a mobile wireless device, a mobile communication device, a tablet, a handset, or other type of wireless device. The UE device 800 can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The UE device 800 can be configured to communicate using at least one wireless communication standard including 3GPP LTE, WiMAX, High Speed Packet Access (HSPA), Bluetooth, and WiFi. The UE device 800 can communicate using separate antennas for each wireless communication standard or shared antennas for multiple wireless communication standards. The UE device 800 can communicate in a wireless local area network (WLAN), a wireless personal area network (WPAN), and/or a WWAN.

In some embodiments, the UE device 800 may include application circuitry 802, baseband circuitry 804, Radio Frequency (RF) circuitry 806, front-end module (FEM) circuitry 808 and one or more antennas 810, coupled together at least as shown.

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with and/or may include a storage medium 812 and may be configured to execute instructions stored in the storage medium 812 to enable various applications and/or operating systems to run on the system.

The baseband circuitry 804 may include circuitry such as, but not limited to, one or more single-core or multi-core processors. The baseband circuitry 804 may include one or more baseband processors and/or control logic to process baseband signals received from a receive signal path of the RF circuitry 806 and to generate baseband signals for a transmit signal path of the RF circuitry 806. Baseband processing circuity 804 may interface with the application circuitry 802 for generation and processing of the baseband signals and for controlling operations of the RF circuitry 806. For example, in some embodiments, the baseband circuitry 804 may include a second generation (2G) baseband processor 804a, third generation (3G) baseband processor 804b, fourth generation (4G) baseband processor 804c, and/or other baseband processor(s) 804d for other existing generations, generations in development or to be developed in the future (e.g., fifth generation (5G), 6G, etc.). The baseband circuitry 804 (e.g., one or more of baseband processors 804a-d) may handle various radio control functions that enable communication with one or more radio networks via the RF circuitry 806. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), precoding, and/or constellation mapping/demapping functionality. In some embodiments, encoding/decoding circuitry of the baseband circuitry 804 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 804e of the baseband circuitry 804 may be configured to run elements of the protocol stack for signaling of the PHY, MAC, RLC, PDCP and/or RRC layers. In some embodiments, the baseband circuitry may include one or more audio digital signal processor(s) (DSP) 804f. The audio DSP(s) 104f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

The RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the RF circuitry 806 may include a receive signal path and a transmit signal path. The receive signal path of the RF circuitry 806 may include mixer circuitry 806a, amplifier circuitry 806b and filter circuitry 806c. The transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c. The filter circuitry 806c may include a low-pass filter (LPF), although the scope of the embodiments is not limited in this respect.

In some embodiments, the mixer circuitry 806a of the receive signal path and the mixer circuitry 806a of the transmit signal path may include two or more mixers and may be arranged for quadrature down-conversion and/or up-conversion respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct down-conversion and/or direct up-conversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect.

In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806d of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810.

In some embodiments, the FEM circuitry 808 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810.

Figure 9:
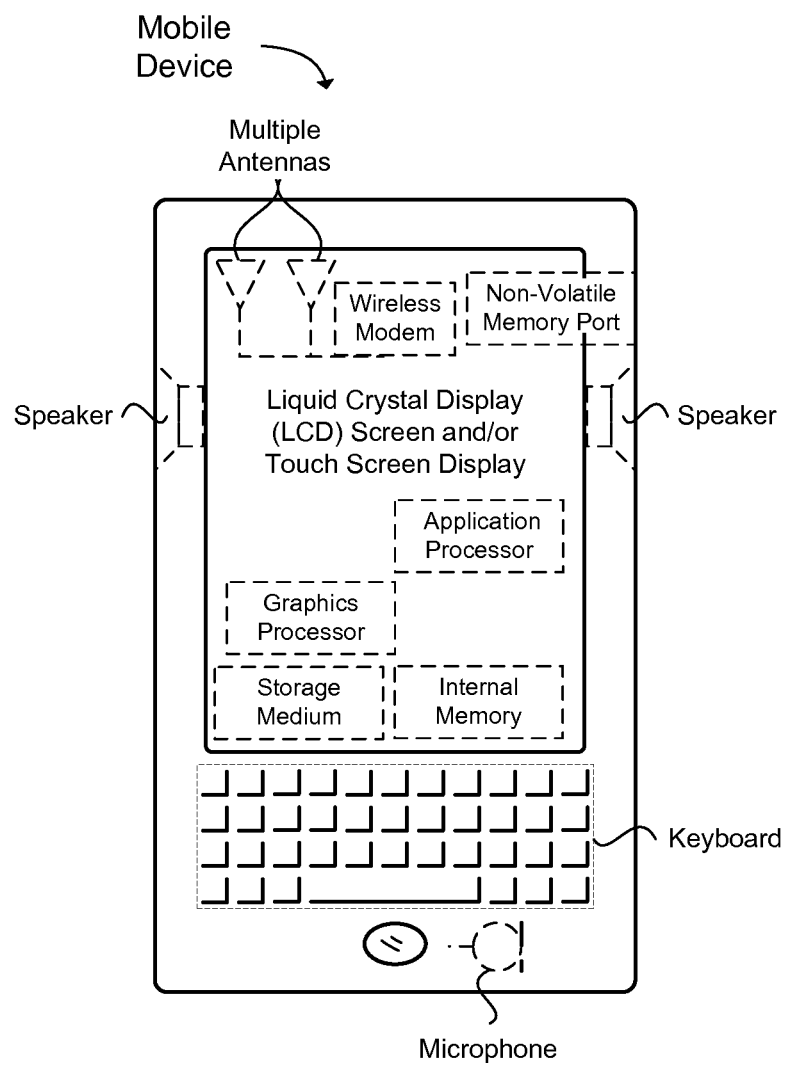
FIG. 9 illustrates a diagram of a wireless device (e.g., UE) in accordance with an example.

FIG. 9 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 9 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes an apparatus of a user equipment (UE) operable to receive system information change notifications from an eNodeB, the apparatus comprising one or more processors and memory configured to: receive, at the UE from the eNodeB, one or more system information (SI) change notifications that indicate a change has occurred in one or more system information blocks (SIBs) with respect to a previous version of the one or more SIBs; receive, at the UE, a SIB1 that is broadcast from the eNodeB, wherein the SIB1 is associated with a value tag and the SIB1 includes a bitmap that indicates which of the one or more SIBs includes a change with respect to the previous version of the SIB; compare the value tag associated with the SIB1 with a value tag stored at the UE; obtain, from the SIB1, scheduling information for the one or more SIBs that include a change according to the bitmap when the value tag associated with the SIB1 does not equal to the value tag stored at the UE; and retrieve the one or more SIBs that include a change using the scheduling information obtained from the SIB1.

Example 2 includes the apparatus of Example 1, further configured to: obtain, from the SIB1, scheduling information for a plurality of SIBs irrespective of whether each of the SIBs include a change when the value tag associated with the SIB1 does not equal to the value tag stored at the UE; and retrieve the plurality of SIBs using the scheduling information obtained from the SIB1.

Example 3 includes the apparatus of any of Examples 1-2, further configured to: read, at the UE, a second SIB1 that is received from the eNodeB after expiry of stored system information (SI) at the UE; compare a value tag associated with the second SIB1 with the value tag stored at the UE; and validate a plurality of SIBs that are stored at the UE for a defined validity period based on the comparison between the value tag associated with the second SIB1 and the value tag stored at the UE.

Example 4 includes the apparatus of any of Examples 1-3, wherein the one or more SI change notifications are received from the eNodeB in paging messages.

Example 5 includes the apparatus of any of Examples 1-4, wherein the one or more SI change notifications are received from the eNodeB over a broadcast control channel (BCCH) modification duration.

Example 6 includes the apparatus of any of Examples 1-5, wherein the one or more SI change notifications are received at the UE after the change in the one or more SIBs is detected at the eNodeB.

Example 7 includes the apparatus of any of Examples 1-6, wherein the UE is a low cost machine type communication (LC-MTC) device or an extended coverage machine type communication (EC-MTC) device and the one or more SIBs are specific to the LC-MTC or the EC-MTC.

Example 8 includes the apparatus of any of Examples 1-7, wherein the UE is a legacy user equipment (UE) and the one or more SIBs are associated with the legacy UE.

Example 9 includes the apparatus of any of Examples 1-8, wherein the UE includes at least one of an antenna, a touch sensitive display screen, a speaker, a microphone, a graphics processor, an application processor, a baseband processor, an internal memory, a non-volatile memory port, and combinations thereof.

Example 10 includes at least one machine readable storage medium having instructions embodied thereon for communicating system information change notifications from an eNodeB to a machine type communication (MTC) device, the instructions when executed perform the following: detecting, using at least one processor at the eNodeB, that a change has occurred in one or more system information blocks (SIBs) with respect to a previous version of the one or more SIBs; communicating, using the at least one processor at the eNodeB, a system information (SI) change notification to the MTC device that indicates a change has occurred in the one or more SIBs; communicating, using the at least one processor at the eNodeB, a bitmap that indicates which of the one or more SIBs includes a change with respect to the previous version of the SIB; and communicating, using the at least one processor at the eNodeB, a SIB1 to the MTC device that includes scheduling information for a plurality of SIBs, wherein the MTC device is configured to obtain scheduling information from the SIB1 for the one or more SIBs that include a change according to the bitmap when a value tag associated with the SIB1 does not equal to a value tag stored at the MTC device, wherein the MTC device is configured to retrieve the one or more SIBs that include a change using the scheduling information obtained from the SIB1.

Example 11 includes the at least one machine readable storage medium of Example 10, wherein the bitmap is included along with the SI change notification that is communicated from the eNodeB to the MTC device.

Example 12 includes the at least one machine readable storage medium of any of Examples 10-11, wherein the bitmap is included in the SIB1 that is communicated from the eNodeB to the MTC device.

Example 13 includes the at least one machine readable storage medium of any of Examples 10-12, wherein the SI change notification is communicated from the eNodeB to the MTC device in a paging message.

Example 14 includes the at least one machine readable storage medium of any of Examples 10-13, wherein the SI change notification is communicated from the eNodeB to the MTC device over a broadcast control channel (BCCH) modification duration.

Example 15 includes the at least one machine readable storage medium of any of Examples 10-14, wherein the SIB1 communicated from the eNodeB is specific to MTC devices and is not utilized for legacy user equipments (UEs).

Example 16 includes an apparatus of a user equipment (UE) operable to receive system information change notifications from an eNodeB, the apparatus comprising one or more processors and memory configured to: receive, at the UE from the eNodeB, a system information (SI) change notification that indicates a change has occurred in one or more system information blocks (SIBs) with respect to a previous version of the one or more SIBs, wherein the SI change notification includes a bitmap that indicates which of the one or more SIBs includes a change with respect to the previous version of the SIB; receive, at the UE, a SIB1 that is broadcast from the eNodeB, wherein the SIB1 includes scheduling information for a plurality of SIBs; compare a value tag associated with the SIB1 with a value tag stored at the UE; obtain, from the SIB1, scheduling information for the one or more SIBs that include a change according to the bitmap when the value tag associated with the SIB1 does not equal to the value tag stored at the UE; and retrieve the one or more SIBs that include a change using the scheduling information obtained from the SIB1.

Example 17 includes the apparatus of Example 16, further configured to: obtain, from the SIB1, scheduling information for a plurality of SIBs irrespective of whether each of the SIBs include a change when the value tag associated with the SIB1 does not equal to the value tag stored at the UE; and retrieve the plurality of SIBs using the scheduling information obtained from the SIB1.

Example 18 includes the apparatus of any of Examples 16-17, further configured to: read, at the UE, a second SIB1 that is received from the eNodeB after expiry of stored system information (SI) at the UE; compare a value tag associated with the second SIB1 with the value tag stored at the UE; and validate a plurality of SIBs that are stored at the UE for a defined validity period based on the comparison between the value tag associated with the second SIB1 and the value tag stored at the UE.

Example 19 includes the apparatus of any of Examples 16-18, wherein the SI change notification is received from the eNodeB in a paging message.

Example 20 includes the apparatus of any of Examples 16-19, wherein the SI change notification is received at the UE after the change in the one or more SIBs is detected at the eNodeB.

Example 21 includes the apparatus of any of Examples 16-20, wherein the UE is a low cost machine type communication (LC-MTC) device or an extended coverage machine type communication (EC-MTC) device and the one or more SIBs are specific to the LC-MTC or the EC-MTC.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE) operable to receive system information change notifications from an eNodeB, the apparatus comprising one or more processors and memory configured to:
　　receive, at the UE from the eNodeB, one or more system information (SI) change notifications that indicate a change has occurred in one or more system information blocks (SIBs) with respect to a previous version of the one or more SIBs;
　　receive, at the UE, a SIB1 that is broadcast from the eNodeB, wherein the SIB1 is associated with a value tag, wherein the value tag refers to a version number of the SIB1, and the SIB1 includes a bitmap that indicates which of the one or more SIBs includes a change with respect to the previous version of the SIB, wherein a number of bits used to send the bitmap depends on a maximum of SIBs that are defined for the UE;

compare the version number of the SIB1 from the value tag associated with the SIB1 with a version number of an SIB1 last received at the UE from an eNodeB from a value tag stored at the UE;
obtain, from the SIB1, scheduling information for the one or more SIBs that include a change according to the bitmap when the version number of the SIB1 from the value tag associated with the SIB1 does not equal the version number of the SIB1 last received at the UE from the value tag stored at the UE; and
retrieve the one or more SIBs that include a change using the scheduling information obtained from the SIB1.

2. The apparatus of claim 1, further configured to:
obtain, from the SIB1, scheduling information for a plurality of SIBs irrespective of whether each of the SIBs include a change when the version number of the SIB1 from the value tag associated with the SIB1 does not equal to the version number of the SIB1 last received at the UE from an eNodeB from the value tag stored at the UE; and
retrieve the plurality of SIBs using the scheduling information obtained from the SIB1.

3. The apparatus of claim 1, further configured to:
read, at the UE, a second SIB1 that is received from the eNodeB after expiry of stored system information (SI) at the UE;
compare a version number of the second SIB1 from the value tag associated with the second SIB1 with the version number of the SIB1 last received at the UE from the value tag stored at the UE; and
validate a plurality of SIBs that are stored at the UE for a defined validity period based on the comparison between the version number of the second SIB1 from the value tag associated with the second SIB1 and the version number of the SIB1 last received at the UE from the value tag stored at the UE.

4. The apparatus of claim 1, wherein the one or more SI change notifications are received from the eNodeB in paging messages.

5. The apparatus of claim 1, wherein the one or more SI change notifications are received from the eNodeB over a broadcast control channel (BCCH) modification duration.

6. The apparatus of claim 1, wherein the one or more SI change notifications are received at the UE after the change in the one or more SIBs is detected at the eNodeB.

7. The apparatus of claim 1, wherein the UE is a low cost machine type communication (LC-MTC) device or an extended coverage machine type communication (EC-MTC) device and the one or more SIBs are specific to the LC-MTC or the EC-MTC.

8. The apparatus of claim 1, wherein the UE is a legacy user equipment (UE) and the one or more SIBs are associated with the legacy UE.

9. The apparatus of claim 1, wherein the UE includes at least one of an antenna, a touch sensitive display screen, a speaker, a microphone, a graphics processor, an application processor, a baseband processor, an internal memory, a non-volatile memory port, and combinations thereof.

10. At least one non-transitory machine readable storage medium having instructions embodied thereon for communicating system information change notifications from an eNodeB to a machine type communication (MTC) device, the instructions when executed perform the following:
detecting, using at least one processor at the eNodeB, that a change has occurred in one or more system information blocks (SIBs) with respect to a previous version of the one or more SIBs;
communicating, using the at least one processor at the eNodeB, a system information (SI) change notification to the MTC device that indicates a change has occurred in the one or more SIBs;
communicating, using the at least one processor at the eNodeB, a bitmap that indicates which of the one or more SIBs includes a change with respect to the previous version of the SIB, wherein a number of bits used to send the bitmap depends on a maximum number of SIBs that are defined for the MTC device; and
communicating, using the at least one processor at the eNodeB, a SIB1 to the MTC device that includes scheduling information for a plurality of SIBs, wherein the MTC device is configured to obtain scheduling information from the SIB1 for the one or more SIBs that include a change according to the bitmap when a version number of the SIB1 from the value tag associated with the SIB1 does not equal a version number of an SIB1 last received at the MTC device from an eNodeB from a value tag stored at the MTC device, wherein the MTC device is configured to retrieve the one or more SIBs that include a change using the scheduling information obtained from the SIB1.

11. The at least one non-transitory machine readable storage medium of claim 10, wherein the bitmap is included along with the SI change notification that is communicated from the eNodeB to the MTC device.

12. The at least one non-transitory machine readable storage medium of claim 10, wherein the bitmap is included in the SIB1 that is communicated from the eNodeB to the MTC device.

13. The at least one non-transitory machine readable storage medium of claim 10, wherein the SI change notification is communicated from the eNodeB to the MTC device in a paging message.

14. The at least one non-transitory machine readable storage medium of claim 10, wherein the SI change notification is communicated from the eNodeB to the MTC device over a broadcast control channel (BCCH) modification duration.

15. The at least one non-transitory machine readable storage medium of claim 10, wherein the SIB1 communicated from the eNodeB is specific to MTC devices and is not utilized for legacy user equipments (UEs).

16. An apparatus of a user equipment (UE) operable to receive system information change notifications from an eNodeB, the apparatus comprising one or more processors and memory configured to:
receive, at the UE from the eNodeB, a system information (SI) change notification that indicates a change has occurred in one or more system information blocks (SIBs) with respect to a previous version of the one or more SIBs, wherein the SI change notification includes a bitmap that indicates which of the one or more SIBs includes a change with respect to the previous version of the SIB, wherein a number of bits used to send the bitmap depends on a maximum number of SIBs that are defined for the UE;
receive, at the UE, a SIB1 that is broadcast from the eNodeB, wherein the SIB1 includes scheduling information for a plurality of SIBs;
compare a version number of the SIB1 from a value tag associated with the SIB1 with a version number of an SIB1 last received at the UE from the eNodeB from a value tag stored at the UE;

obtain, from the SIB1, scheduling information for the one or more SIBs that include a change according to the bitmap when the version number of the SIB1 from the value tag associated with the SIB1 does not equal the version number of the SIB1 last received at the UE from the value tag stored at the UE; and retrieve the one or more SIBs that include a change using the scheduling information obtained from the SIB1.

17. The apparatus of claim 16, further configured to:

obtain, from the SIB1, scheduling information for a plurality of SIBs irrespective of whether each of the SIBs include a change when the version number of the SIB1 from the value tag associated with the SIB1 does not equal to the version number of the SIB1 last received at the UE from the value tag stored at the UE; and retrieve the plurality of SIBs using the scheduling information obtained from the SIB1.

18. The apparatus of claim 16, further configured to:

read, at the UE, a second SIB1 that is received from the eNodeB after expiry of stored system information (SI) at the UE;

compare a version number of the second SIB1 from the value tag associated with the second SIB1 with the version number of the SIB1 last received at the UE from the value tag stored at the UE; and validate a plurality of SIBs that are stored at the UE for a defined validity period based on the comparison between the version number of the second SIB1 from the value tag associated with the second SIB1 and the version number of the SIB1 last received at the UE from the value tag stored at the UE.

19. The apparatus of claim 16, wherein the SI change notification is received from the eNodeB in a paging message.

20. The apparatus of claim 16, wherein the SI change notification is received at the UE after the change in the one or more SIBs is detected at the eNodeB.

21. The apparatus of claim 16, wherein the UE is a low cost machine type communication (LC-MTC) device or an extended coverage machine type communication (EC-MTC) device and the one or more SIBs are specific to the LC-MTC or the EC-MTC.

* * * * *